(12) United States Patent
Hui et al.

(10) Patent No.: US 11,186,358 B2
(45) Date of Patent: Nov. 30, 2021

(54) AERODYNAMIC BODY HAVING PERFORATED SKIN

(71) Applicant: AIRBUS OPERATIONS LIMITED, Bristol (GB)

(72) Inventors: Ching-Yu Hui, Bristol (GB); Alan Mann, Bristol (GB)

(73) Assignee: Airbus Operations Limited, Bristol (GB)

( * ) Notice: Subject to any disclaimer, the term of this patent is extended or adjusted under 35 U.S.C. 154(b) by 127 days.

(21) Appl. No.: 16/608,569

(22) PCT Filed: Mar. 22, 2018

(86) PCT No.: PCT/EP2018/057353
§ 371 (c)(1),
(2) Date: Oct. 25, 2019

(87) PCT Pub. No.: WO2018/197120
PCT Pub. Date: Nov. 1, 2018

(65) Prior Publication Data
US 2020/0055591 A1    Feb. 20, 2020

(30) Foreign Application Priority Data
Apr. 27, 2017   (GB) ..................... 1706682

(51) Int. Cl.
| | |
|---|---|
| *B64C 21/08* | (2006.01) |
| *B64C 21/06* | (2006.01) |
| *B64D 15/12* | (2006.01) |

(52) U.S. Cl.
CPC .............. *B64C 21/08* (2013.01); *B64C 21/06* (2013.01); *B64D 15/12* (2013.01);
(Continued)

(58) Field of Classification Search
CPC ........ B64C 21/025; B64C 21/04; B64C 21/06; B64C 21/08; B64C 2230/06;
(Continued)

(56) References Cited

U.S. PATENT DOCUMENTS

| | | | |
|---|---|---|---|
| 1,948,426 A | * | 2/1934 | Mcbride ................. B64C 21/02 244/219 |
| 2,406,475 A | * | 8/1946 | Rogers .................... B64C 21/02 244/210 |

(Continued)

FOREIGN PATENT DOCUMENTS

| | | |
|---|---|---|
| EP | 1 019 283 B1 | 7/2000 |
| WO | 03/089295 | 10/2003 |
| WO | 2015/198296 | 12/2015 |

OTHER PUBLICATIONS

International Search Report and Written Opinion of the ISA for PCT/EP2018/057353 dated Jun. 13, 2018, 13 pages.

*Primary Examiner* — Joseph W Sanderson
(74) *Attorney, Agent, or Firm* — Nixon & Vanderhye P.C.

(57) ABSTRACT

An aerodynamic body for use on an aircraft including at least a first perforated surface portion (25) and an ice-protection system (31). The first perforated surface portion (25) has perforations. The ice-protection system (31) includes an actuatable element (33) and the actuatable element (33) is movable or deformable between a first position and a second position. In the first position, the actuatable element (33) is thermally coupled to the first perforated surface portion (25) and configured to prevent an inflow or outflow between a boundary layer of an outer aerodynamic airflow and the aerodynamic body through at least one of the perforations. In the second position, the actuatable element (33) is distanced from the first perforated surface portion (25) and configured to allow an inflow from (Continued)

a boundary layer of an outer aerodynamic airflow through at least one of the perforations into the aerodynamic body.

16 Claims, 8 Drawing Sheets

(52) U.S. Cl.
  CPC ...... *B64C 2230/06* (2013.01); *B64C 2230/20* (2013.01); *B64C 2230/22* (2013.01)

(58) Field of Classification Search
  CPC ............. B64C 2230/20; B64C 2230/22; F15D 1/0055; F15D 1/008
  See application file for complete search history.

(56) References Cited

U.S. PATENT DOCUMENTS

| | | | | |
|---|---|---|---|---|
| 2,539,222 | A * | 1/1951 | Battaglia | B64C 21/08 244/204 |
| 3,441,236 | A * | 4/1969 | Eric | B64D 15/02 244/204 |
| 4,114,836 | A * | 9/1978 | Graham | B64C 23/00 244/1 N |
| 4,117,995 | A * | 10/1978 | Runge | B64C 9/146 244/207 |
| 4,630,997 | A * | 12/1986 | Cousteau | B63H 9/02 416/90 A |
| 5,590,854 | A * | 1/1997 | Shatz | B64C 3/141 244/206 |
| 6,135,395 | A * | 10/2000 | Collett | B64C 21/06 244/209 |
| 6,202,304 | B1 | 3/2001 | Shatz | |
| 6,368,059 | B1 * | 4/2002 | Maines | B63H 1/15 416/42 |
| 6,622,973 | B2 * | 9/2003 | Al-Garni | B64C 21/025 244/206 |
| 7,152,829 | B2 * | 12/2006 | Bertolotti | B64C 21/06 244/209 |
| 8,251,317 | B2 * | 8/2012 | Pitt | B64C 21/08 244/204 |
| 8,632,031 | B2 * | 1/2014 | Shmilovich | B64C 9/38 244/1 N |
| 10,259,566 | B1 * | 4/2019 | Lawrence | B64C 9/24 |
| 10,442,526 | B2 * | 10/2019 | Gueuning | B64D 15/04 |
| 10,928,839 | B2 * | 2/2021 | Glezer | B64C 21/08 |
| 2002/0179777 | A1 * | 12/2002 | Al-Garni | B64C 23/02 244/206 |
| 2005/0178924 | A1 * | 8/2005 | Bertolotti | B64C 21/06 244/209 |
| 2007/0221788 | A1 * | 9/2007 | Meister | B64C 21/025 244/208 |
| 2009/0261204 | A1 * | 10/2009 | Pitt | B64C 21/08 244/201 |
| 2012/0256049 | A1 * | 10/2012 | Shmilovich | B64C 21/08 244/1 N |
| 2017/0217569 | A1 * | 8/2017 | Gueuning | B64C 5/06 |
| 2018/0265208 | A1 * | 9/2018 | Yousef | B64C 21/04 |

\* cited by examiner

AERODYNAMIC BODY HAVING PERFORATED SKIN

This application is the U.S. national phase of International Application PCT/EP2018/057353 filed Mar. 22, 2018, which designated the U.S. and claims priority to United Kingdom Patent Application GB 1706682.0 filed Apr. 27, 2017, the entire contents of both of these applications is incorporated by reference.

TECHNICAL FIELD

The present disclosure relates generally to an aerodynamic body having a leading edge and being designed to provide laminar flow over at least a portion of the surface of the aerodynamic body.

BACKGROUND

As the major component of operating cost of a commercial aircraft is fuel and the major contributor to fuel consumption is aerodynamic drag, the reduction of aerodynamic drag is a prime goal in the design of aerodynamic surfaces of a commercial aircraft. Laminar boundary layer flow or, in short, laminar flow over an aerodynamic surface is generally associated with less drag than turbulent flow over that aerodynamic surface. Techniques to achieve laminar flow are typically categorised into: (i) natural laminar flow (NLF), which is established by aerodynamic shape and surface quality without requiring any active or powered device; (ii) active laminar flow (ALF), which requires an active or powered device to establish or maintain the laminar flow; and (iii) hybrid laminar flow (HLF), which can be a combination of NLF and ALF or include other ways of influencing or controlling the boundary layer. HLF also sometimes refers to a co-existence of laminar and turbulent flow regimes using techniques aiming for delaying an onset of a turbulent boundary layer by establishing and maintaining a certain laminar regime before the onset of a turbulent layer. A known mechanism to achieve a certain laminar regime is to dampen growth of small perturbations in the boundary layer by suction through micro perforations in the surface, thereby delaying the onset of boundary layer transition.

WO 03/089295 describes an outer skin of an aerodynamic body with perforations for laminar flow control through suction of boundary layer air.

EP 1 019 283 B1 describes an aerodynamic body with a high-lift portion, wherein at least a substantial part of an upper surface of said high-lift portion is air permeable or perforated.

These known solutions comprise a plurality of suction chambers across most of the upper surface to control the pressure distribution. A plurality of suction chambers adds complexity and weight and makes it more difficult to integrate ice-protection systems.

U.S. Pat. No. 6,202,304 B1 describes a movable sheet that serves as an integral, retractable shield for protecting a suction support structure of a wing against contamination, and also serves as a movable, conductive substrate for de-icing by means of electrical resistance or hot-gas heating. That solution is very complex and requires a movable skin sheet being mounted scroll-like.

SUMMARY

Embodiments of the present invention provide an aerodynamic body having a laminar flow leading edge with less complexity and weight including an integrated ice-protection system.

In accordance with a first aspect of the present invention, an aerodynamic body for use on an aircraft is provided including at least a first perforated surface portion and an ice-protection system,
wherein the ice-protection system includes an actuatable element,
wherein the actuatable element is movable or deformable between a first position and a second position,
wherein in the first position at least a section of the actuatable element is thermally coupled to the first perforated surface portion,
wherein in the second position at least a section of the actuatable element is distanced from the first perforated surface portion.

At least some of the perforations may comprise micro-perforations.

Herein, "perforated" or "perforations" shall denote a plurality of orifices distributed over a surface portion. Optionally, the shape of the perforations of the first flow surface portion may be circular, slotted, oval or of any geometry that allows an air inflow. The orientation, shape and/or size of the perforations may be the same for all or they may gradually or non-gradually vary over the first flow surface portion or between sub-sections thereof. "Micro-perforated" or "micro-perforations" shall denote orifices having one or more sizes in the sub-millimetre range. The size of the micro-perforations may be 20-100 μm, for instance 50 μm, with a relative distance of 100-1000 μm to each other, for instance 500 μm.

"Thermal coupling" or "thermal contact" shall mean any form of direct or indirect contact that allows an efficient heat transfer.

The actuatable element of the ice-protection system may provide heating to the first perforated surface portion before or during take-off of the aircraft. When the aircraft is in cruise mode at altitudes where ice-protection is not needed, the actuatable element of the ice-protection system may be moved or deformed into the second position to allow an inflow or outflow between a boundary layer of an outer aerodynamic airflow and the aerodynamic body through at least one of the perforations. Such an inflow or outflow may create or support a laminar flow around the aerodynamic body by delaying the onset of a turbulent layer. Thus, for example, the aerodynamic body may produce less drag in cruise mode with reduced fuel consumption of the aircraft.

Optionally, the actuatable element includes an electrical heating element. Electrical heating elements may be lighter and less complex than hot-air systems. The electrical heating element may be a heating mat. The actuable element may be hinged and/or connected to a stationary element to allow for a defined and reproducible path for moving or deforming between the first position and the second position.

Optionally, the aerodynamic body is at least one of a group comprising a main aircraft wing, a horizontal stabiliser, a vertical tail-plane and a high-lift leading edge device. So, an aircraft may comprise one or more aerodynamic bodies with such features. A leading edge device like a slat is particularly suitable to accommodate a deformable actuatable element, because only limited space is available within such a device.

Optionally, the actuatable element is movable in a rotatory and/or a translatory way between the first position and the second position. The actuatable element may rotate within a single suction chamber and/or be track-mounted to move within a single suction chamber.

Optionally, the aerodynamic body defines a leading edge and at least a part of a local chord extending between the leading edge and a trailing edge, and wherein the first perforated surface portion may extend around the leading edge over 3% or less of the local chord. A limited first micro-perforated surface portion may facilitate using a passive pressure differential with a single suction chamber for sucking in an inflow from a boundary layer. An active suction system may not be needed, in particular in case of a leading edge device, owing to limited space within the leading edge device.

Optionally, the ice-protection system includes a stationary element aft of the actuatable element. The stationary element may be permanently thermally coupled to a non-perforated surface portion of the aerodynamic body. Aft of the laminar flow leading edge, which may be at a distance of more than 3% of the local chord from the leading edge, the skin may have a surface quality allowing for NLF without any boundary layer control by suction. The ice-protection system may thus include a stationary element to heat such a non-perforated surface portion.

Optionally, the aerodynamic body includes at least a second perforated surface portion aft of the non-perforated surface portion. Aft of the non-perforated surface portion, which may be at a distance of more than 10% of the local chord from the leading edge, a second perforated surface portion may be used to further delay the onset of boundary layer transition, by suction. An ice-protection system is not needed at that distance from the leading edge, so that neither the actuatable element nor the stationary element of the ice-protection system needs to heat the second perforated surface portion.

Optionally, the aerodynamic body includes an active suction system for creating and/or supporting an inflow from a boundary layer of an outer aerodynamic airflow through at least one of the perforations into the aerodynamic body, and wherein the actuatable element is configured to be sucked into the second position by the active suction system. Sometimes an active suction device may be needed to create or support the suction by ALF or HLF, for instance when the leading edge is part of the main wing without a slat, e.g. for wings with a Krueger flap. In such a case, the active suction system can be used to suck the actuatable element into the second position. The actuatable element may be movable and/or deformable within a single suction chamber and the active suction system may pneumatically actuate the actuatable element.

Optionally, the aerodynamic body includes a solenoid, wherein the actuatable element is configured to be moved into the second position by the solenoid. The solenoid may support a pneumatic actuation or may be used as an alternative to pneumatic actuation. This is useful, in particular, when no active suction system is used.

Optionally, the actuatable element includes a bi-metal component being deformable upon temperature changes, wherein the bi-metal component is configured to deform the actuatable element into the first position when the ice-protection system is used, and wherein the bi-metal component is configured to deform the actuatable element into the second position when the ice-protection system is not used. Such an embodiment is very compact and thus useful in a slat where little inner space is available for actuation systems. The bi-metal component as part of the actuatable element does not require any substantial space and may be able to curl the actuatable element away from the skin into the second position or straighten it into thermal contact with the skin to heat the skin up for ice-protection.

Optionally, the actuatable element is spring-loaded towards the first position. A spring may provide additional force to achieve a good thermal coupling between the actuatable element and the skin. In order to actuate the actuatable element towards the second position, a pneumatic and/or a magnetic and/or a deforming force may be required that is high enough to overcome the spring force bias towards the first position.

In accordance with a second aspect of the present disclosure, a method for creating and/or supporting a laminar flow around an aerodynamic body is provided including:

providing an aerodynamic body including at least a first perforated surface portion and an ice-protection system, wherein the ice-protection system includes an actuatable element, actuating the actuatable element to move or deform into a first position, wherein in the first position at least a section of the actuatable element is thermally coupled to the first perforated surface portion, heating the first perforated surface portion for ice-protection, actuating the actuatable element to move or deform into a second position, wherein in the second position at least a section of the actuatable element is distanced from the first perforated surface portion.

Optionally, the method comprises providing an active suction system for creating and/or supporting an inflow or outflow between a boundary layer of an outer aerodynamic airflow and the aerodynamic body through at least one of the perforations, wherein activating the actuatable element to move or deform into the second position comprises sucking the actuatable element into the second position by the active suction system.

Optionally, the method includes providing a solenoid, wherein activating the actuatable element to move or deform into the second position comprises moving the actuatable element into the second position by the solenoid.

Optionally, the method includes providing a bi-metal component of the actuatable element, wherein activating the actuatable element to move or deform into the first position comprises heating the bi-metal component and thereby deforming the actuatable element, wherein activating the actuatable element to move or deform into the second position comprises letting the bi-metal component cool down and thereby deforming the actuatable element.

SUMMARY OF THE DRAWINGS

Embodiments of the present disclosure will now be described by way of example only with reference to the following figures of which.

DETAILED DESCRIPTION

Figure 1:
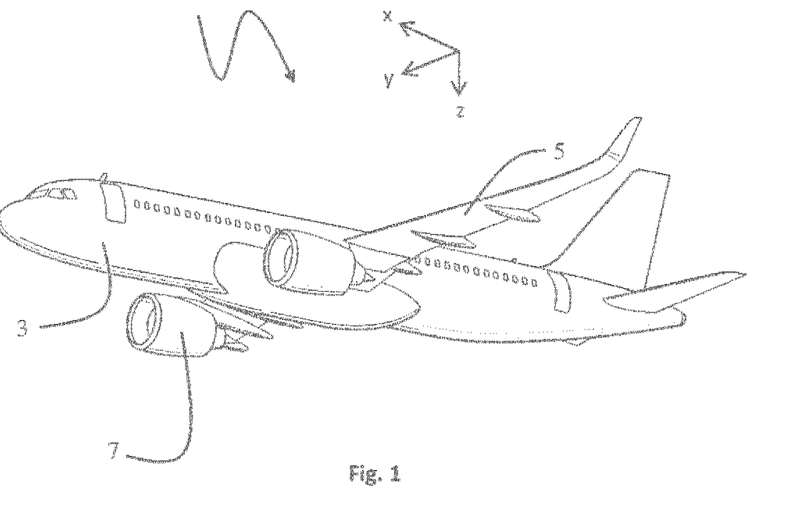
FIG. 1 is a schematic perspective view on an aircraft with an aerodynamic body in accordance with an example of the present disclosure.

FIG. 1 shows an aircraft 1 comprising a fuselage 3 and wings 5 to which engines 7 are attached. A right-handed Cartesian coordinate system shows an x-axis as the longitudinal aircraft axis, also known as roll axis, directed in the direction of flight; a y-axis as the lateral aircraft axis, also known as the pitch axis, essentially directed in spanwise direction of the wing 5 on the right-hand side of the aircraft 1; and a z-axis as the vertical aircraft axis, also known as the yaw axis, directed downward. This coordinate system is used throughout FIGS. 1-13, wherein the wing 5 on the right-hand side of the aircraft 1 is used to describe the present disclosure in detail. It will be readily understood by the reader that the present disclosure applies symmetrically for the wing 5 on the left-hand side of the aircraft 1 or other aerodynamic bodies like the horizontal or vertical tail-plane. The term "aerodynamic body" herein may denote any aerodynamically active component of an aircraft and may thus be selected from at least one of a group comprising: a main aircraft wing, a horizontal stabiliser, a vertical tail-plane, a high-lift leading edge device.

Figure 2:
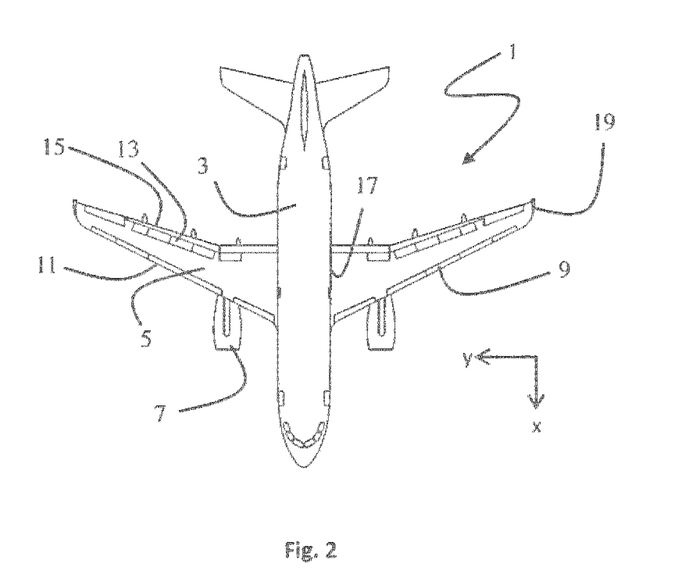
FIG. 2 is a top view on an aircraft with an aerodynamic body in accordance with an example of the present disclosure.

FIG. 2 shows a few more details of the wings 5 of the aircraft 1, for instance high-lift devices 9 at a leading edge 11 of the wings 5. Such leading edge high-lift devices 9 are also referred to as slats, which can be deployed to increase lift during aircraft take-off and landing, and retracted during aircraft cruise to reduce drag. Other trailing edge high-lift devices 13, often referred to as flaps, are located at a wing trailing edge 15 have a similar purpose. The wings 5 extend from a wing root 17 attached to the fuselage 3 to a wing tip 19.

Figure 3:
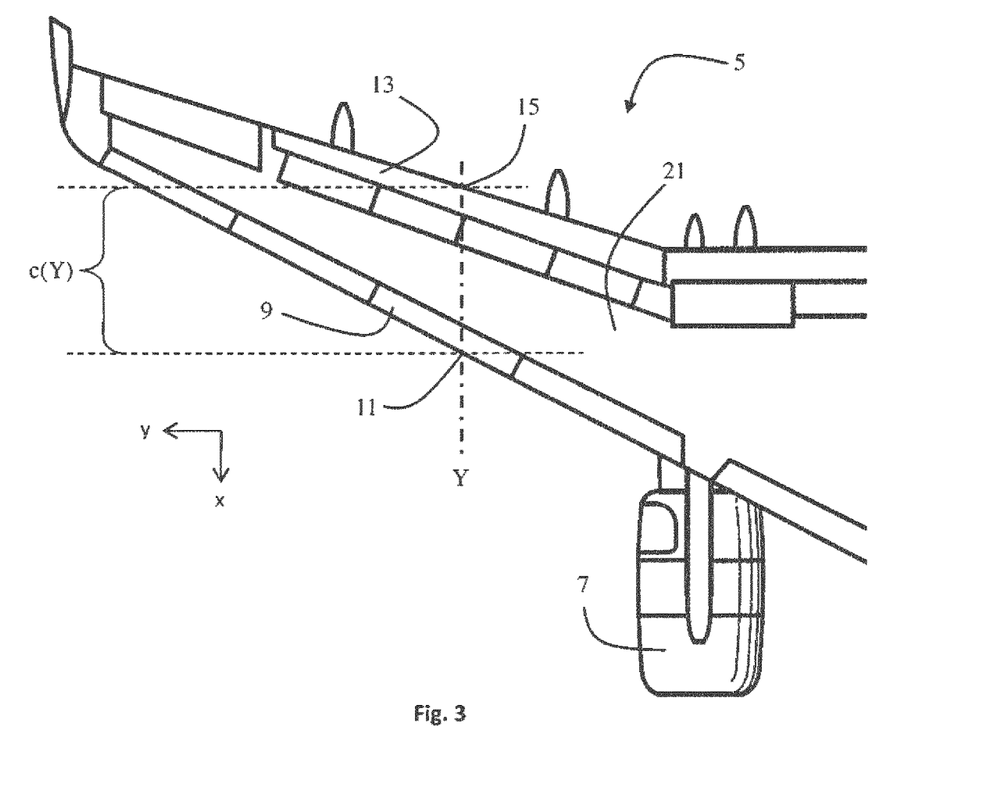
FIG. 3 is top view on a wing of an aircraft with an aerodynamic body in accordance with an example of the present disclosure.

FIG. 3 shows the right-handed wing 5 of the aircraft 1 comprising a wing including a main wing portion 21, the leading edge high-lift devices 9 and the trailing edge high-lift devices 13. Depending on the lateral spanwise position along the y-axis, the wing trailing edge 15 of the wing 5 may be defined by the trailing edge high-lift devices 13, the main wing portion 21, or other control surfaces like ailerons or spoilers. In FIG. 3, the lateral position Y in spanwise direction along the y-axis is arbitrarily chosen to show the local chord c(Y) between the leading edge 11 and the wing trailing edge 15 at position Y. The local chord c(y) is in general a length dependent on the lateral position y in spanwise direction along the y-axis. The chord is to be understood as a feature of the aerodynamic body's airfoil in cruise, i.e. the direct distance between the leading edge 11 and the wing trailing edge 15 in the xz-plane when high-lift devices 9 and 13 are retracted.

Figure 4:
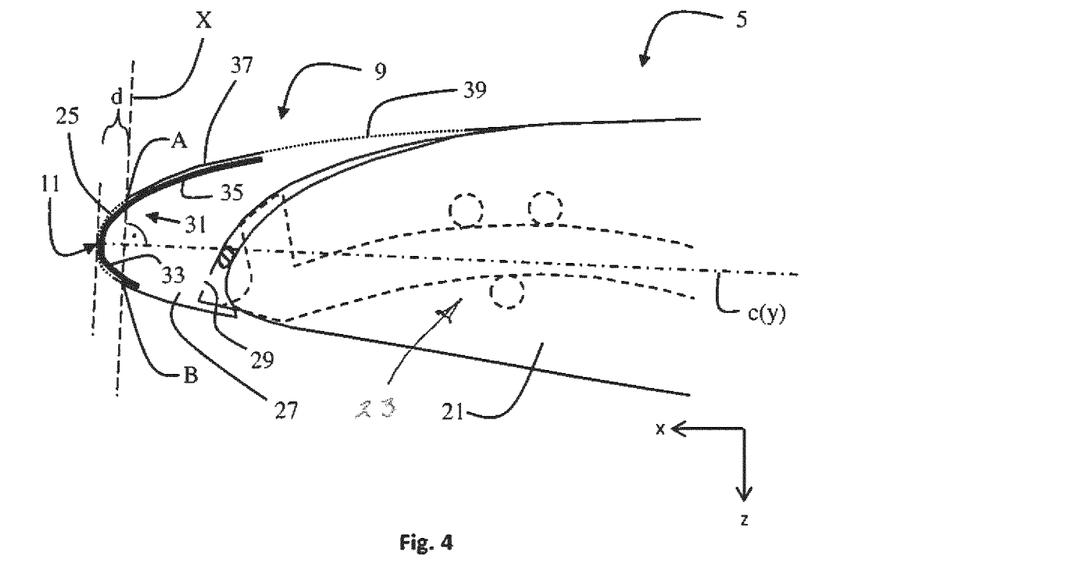
FIG. 4 is a cross-sectional view of a forward portion of an aircraft wing with a slat as an aerodynamic body in accordance with an example of the present disclosure.

FIG. 4 is a detailed cross-sectional view on a forward portion of wing 5, wherein the leading edge high-lift device 9, also referred to as a slat, is in a retracted position close to the main wing portion 21. The leading edge high-lift device 9 is movably coupled to the main wing portion 21 via a deployment system 23. The deployment system 23 is displayed as a rail system (dashed), but it may be any type of linkage system that allows the leading edge high-lift device 9 to be moved between a retracted cruise position and a deployed high-lift position for take-off and landing.

The local chord c(y) is displayed as a linear dash-dotted line between the leading edge 11 and the trailing edge 15 (not shown in FIG. 4). A dashed plane X vertical to the local chord c(y) and located at a distance $d=0.03 \times c(y)$ defines an upper borderline A and a lower borderline B on the skin of the leading edge high-lift device 9. A first perforated surface portion 25 is located around the leading edge and extends between the upper borderline A and the lower borderline B. The first perforated surface portion 25 may cover less than the full skin portion between the upper borderline A and the lower borderline B. The limitation of the first perforated surface portion 25 has the advantage that the full inner volume of the leading edge high-lift device 9 can be used as a single suction chamber 27 for passive HLF without an active suction system. Thereby, no complex plurality of suction chambers is needed.

The leading edge high-lift device 9 is provided with at least one outlet 29, at which the air pressure is lower than the pressure at the perforations for suction by active or passive HLF control. The pressure differential may be actively sustained by an active suction system or passively sustained by the outer aerodynamic airflow in flight. For passive HLF control, the location of the outlet 29 is chosen to be at a position of low pressure according to the design of the aerodynamic body. Such a low-pressure position may be at the backward surface of the leading edge high-lift device 9 as shown in FIG. 4. Alternatively or in addition, an outlet may be provided at a skin of the aerodynamic body with an opening essentially directed backward so that the outer aerodynamic airflow in flight provides a point of low pressure at the outlet.

Figure 13:
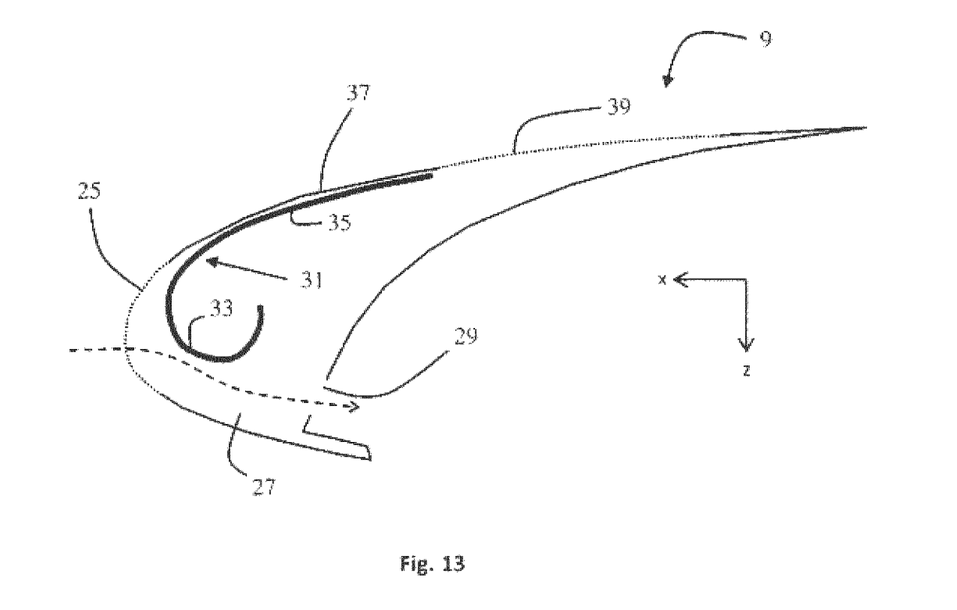
FIG. 13 is a cross-sectional view of a slat as an aerodynamic body in accordance with an example of the present disclosure with a deformable actuatable element in the second position.

An ice-protection system 31 in the form of an electric wing ice protection system (eWIPS) with an electrical heating element is located in thermal contact with the leading edge skin of the leading edge high-lift device 9 and significant portions of the upper skin of the leading edge high-lift device 9. The ice-protection system 31 has a forward portion and an aft portion. The forward portion of the ice-protection system 31 comprises an actuatable element 33 of which at least a section is thermally coupled to the first perforated surface portion 25. The actuatable element 33 is movable and/or deformable between a first position in thermal contact with the first perforated surface portion 25 (as shown in FIGS. 4 and 13) and a second position distanced from the first perforated surface portion 25 (as shown in FIG. 13). The aft portion of the ice-protection system 31 comprises a stationary element 35 which is permanently thermally coupled to a non-perforated surface portion 37 of the leading edge high-lift device 9. The non-perforated surface portion 37 and the stationary element 35 may extend between 3% and 10% of the local chord c(y). Aft of the non-perforated surface portion 37 and the stationary element 35, e.g. distanced at more than 10% of the local chord c(y) from the leading edge 11, the leading edge high-lift device 9 comprises a second perforated surface portion 39 for HLF control which does not need ice-protection.

Figure 5:
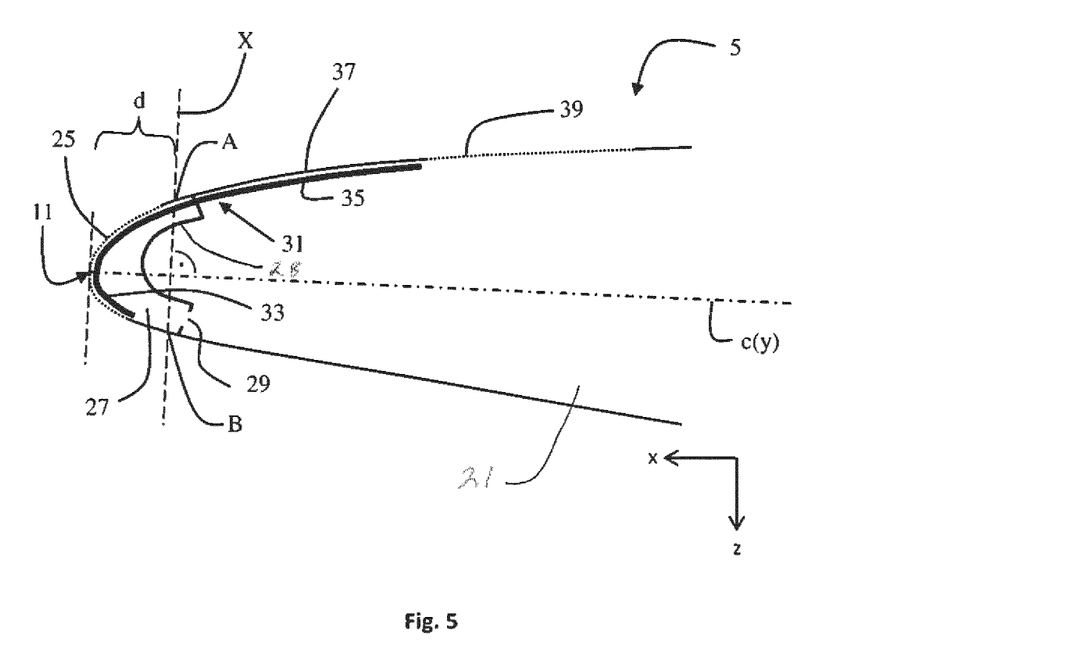
FIG. 5 is a cross-sectional view of a forward portion of an aircraft wing as an aerodynamic body in accordance with an example of the present disclosure.

FIG. 5 is a detailed cross-sectional view on the forward portion of a wing 5 as an aerodynamic body without a slat, wherein the main wing portion 21 defines the leading edge 11. Similar to FIG. 4, the dashed line X vertical to the local chord c(y) and located at a distance d=0.03×c(y) defines the upper borderline A and the lower borderline B on the skin for the first perforated surface portion 25. The first perforated surface portion 25 may cover less than the full skin portion between the upper borderline A and the lower borderline B. Rather than using the full slat volume, the single suction chamber 27 of the wing 5 in FIG. 5 may be defined by an inner wall 28. As in FIG. 4, the limitation of the first perforated surface portion 25 has the advantage that the single suction chamber 27 can be used for passive HLF control without an active suction system. Thereby, no complex plurality of suction chambers is needed.

Figure 7:
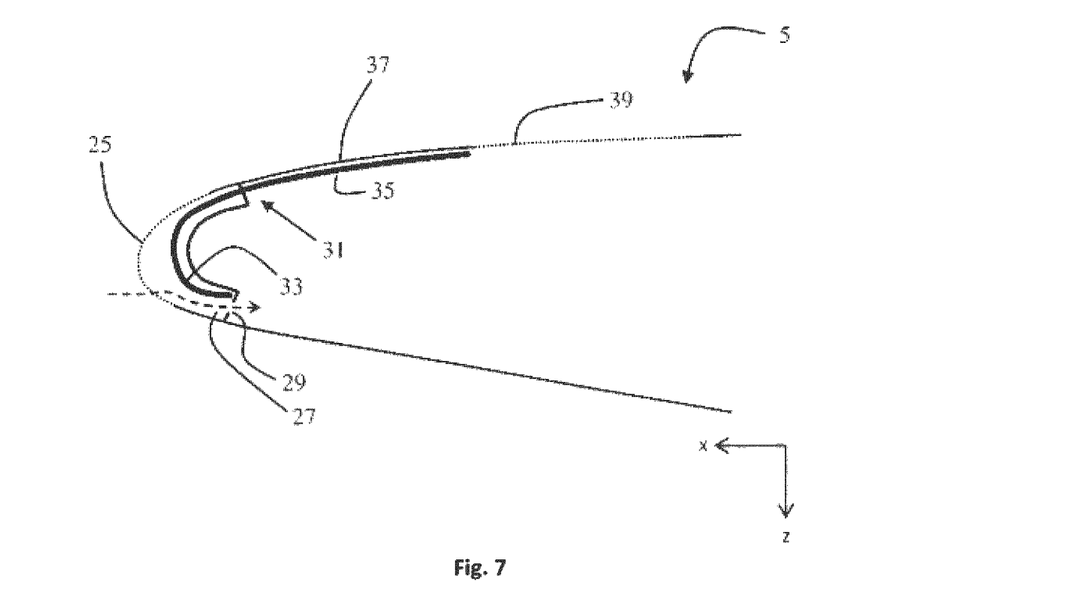
FIG. 7 is a cross-sectional view of a forward portion of an aerodynamic body in accordance with an example of the present disclosure with a deformable actuatable element in the second position.

At least a section of the actuatable element 33 of the eWIPS 31 is thermally coupled to the first perforated surface portion 25. The actuatable element 33 is movable and/or deformable between a first position in thermal contact with the first perforated surface portion 25 (as shown in FIG. 5) and a second position distanced from the first perforated surface portion 25 (as shown in FIG. 7). The aft portion of the ice-protection system 31 comprises a stationary element 35 which is permanently thermally coupled to significant portions of the upper skin of the leading edge high-lift device 9. The stationary element 35 may extend between 3% and 10% of the local chord c(y). Aft of the non-perforated surface portion 37 and the stationary element 35, e.g. distanced at more than 10% of the local chord c(y) from the leading edge 11, the wing 5 comprises a second perforated surface portion 39 for HLF control which does not need ice-protection.

The wing 5 is provided with at least one outlet 29, at which the air pressure is lower than the pressure at the perforations for suction by active or passive HLF control. The pressure differential may be actively sustained by an active suction system or passively sustained by the outer aerodynamic airflow in flight. For passive HLF control, the location of the outlet 29 is chosen to be at a position of low pressure according to the design of the aerodynamic body. Such a low-pressure position may be at the backward surface of the single suction chamber 27 as shown in FIG. 5. Alternatively or in addition, an outlet 29 may be provided at a skin of the aerodynamic body with an opening essentially directed backward so that the outer aerodynamic airflow in flight provides a point of low pressure at the outlet 29.

Figure 6:
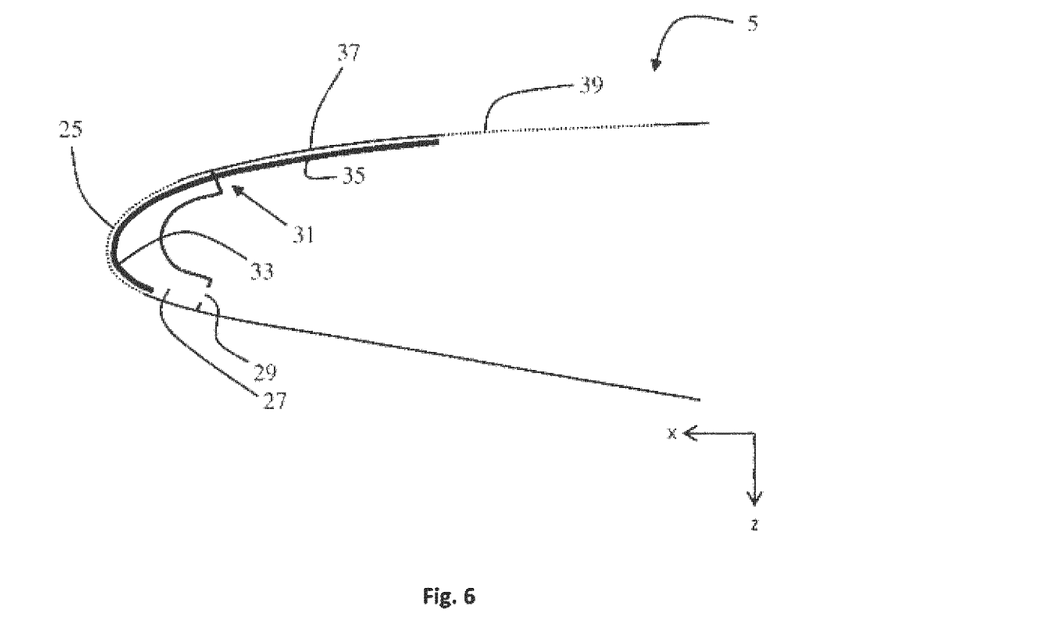
FIG. 6 is a cross-sectional view of a forward portion of an aerodynamic body in accordance with an example of the present disclosure with a deformable actuatable element in the first position.

FIGS. 6 and 7 illustrate the two positions of the actuatable element 33, the first position in FIG. 6 and the second position in FIG. 7. The actuatable element 33 of the eWIPS 31 comprises a bi-metal component that is deformable upon temperature changes. When heated up (as shown in FIG. 6), e.g. before or during take-off of the aircraft 1, the bi-metal component straightens the actuatable element 33 into the first position into thermal contact with the first perforated surface portion 25 for heating it up to prevent accumulation of ice on the first perforated surface portion 25. The perforations of the first perforated surface portion 25 are closed from within by the actuatable element 33 in the first position so that an inflow from a boundary layer of an outer aerodynamic airflow through the perforations into the aerodynamic body is prevented.

When the eWIPS 31 is not in use, e.g. during cruise of the aircraft 1, the bi-metal component cools down and curls the actuatable element 33 away from first perforated surface portion 25. In the second position as shown in FIG. 7, the actuatable element 33 opens the perforations of the first perforated surface portion 25 and allows an inflow from a boundary layer of an outer aerodynamic airflow through the first perforated surface portion 25. FIGS. 6 and 7 also show a second perforated surface portion 39 aft of the non-perforated surface portion 37. Thus, aft of the leading edge region, e.g. at more than 3% distance of local chord from the leading edge 11, an area with eWIPS 31 and an area with laminar flow control may be separated to reduce complexity.

Figure 8:
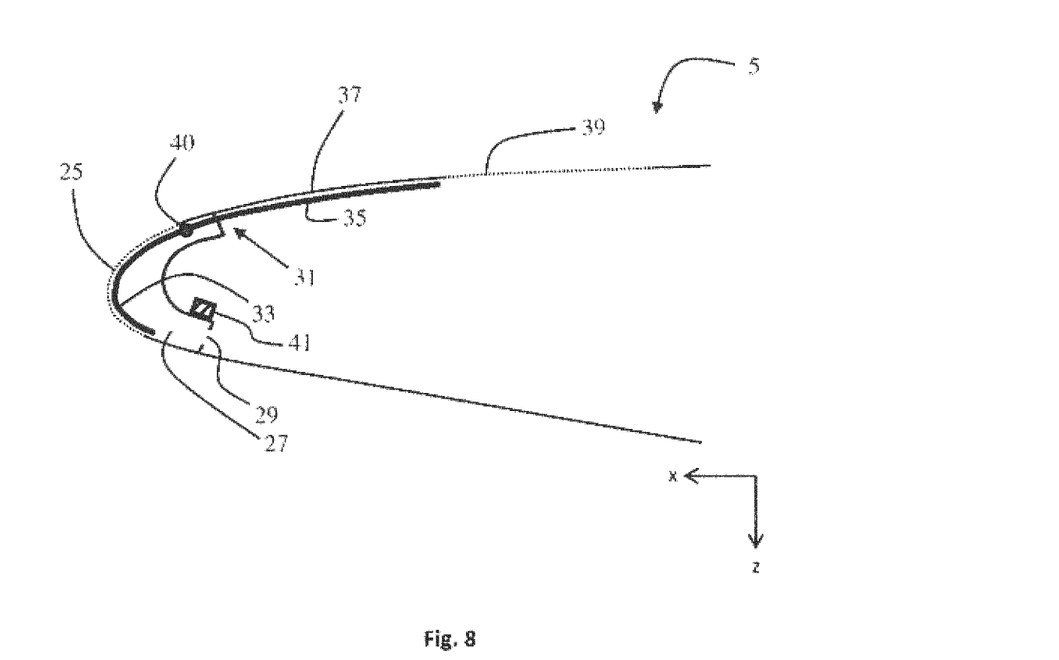
FIG. 8 is a cross-sectional view of a forward portion of an aerodynamic body in accordance with an example of the present disclosure with a solenoid as an actuator and a hinged actuatable element in the first position.
Figure 9:
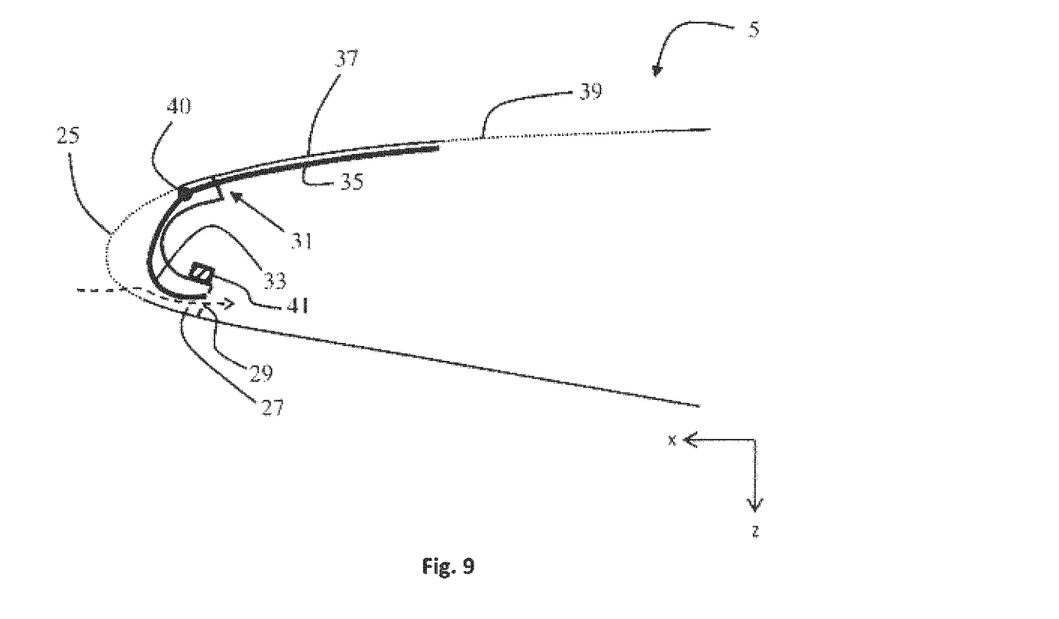
FIG. 9 is a cross-sectional view of a forward portion of an aerodynamic body in accordance with an example of the present disclosure with a solenoid as an actuator and a hinged actuatable element in the second position.

The difference between FIGS. 8 and 9 and FIGS. 6 and 7 is that the actuatable element 33 of FIGS. 8 and 9 is now hinged at a hinge 40. The actuatable element 33 can be rotated from the first position in FIG. 8 to the second position in FIG. 9 by way of a solenoid 41. The solenoid 41 may magnetically push and/or pull the actuatable element 33 between the first and second position or work against a spring force if the actuatable element is spring-loaded towards the first position. The hinged actuatable element 33 may in addition be deformable and comprise a bi-metal component.

Figure 10:
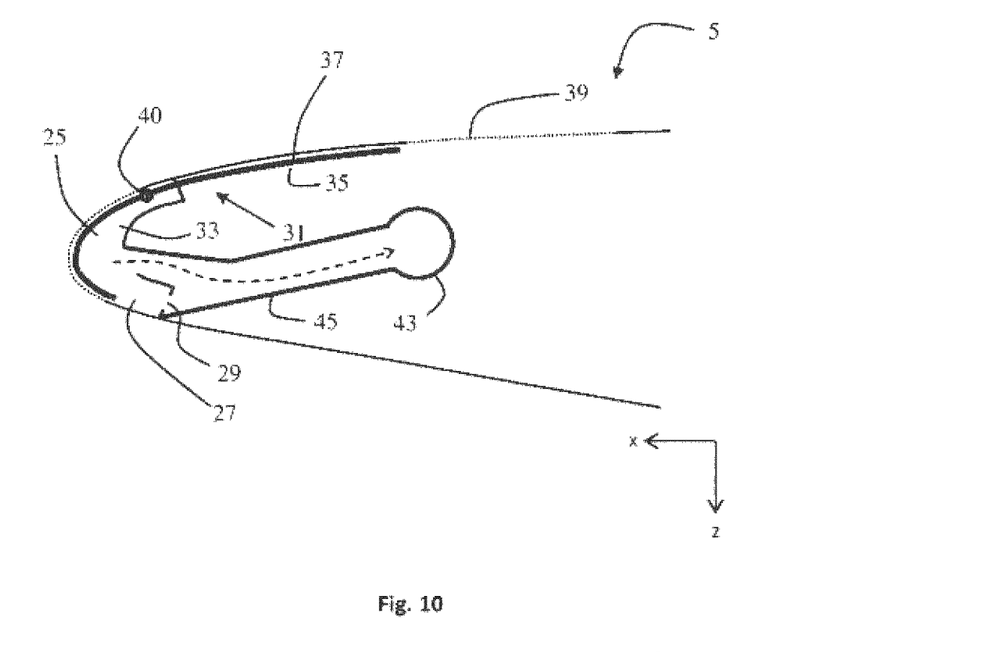
FIG. 10 is a cross-sectional view of a forward portion of an aerodynamic body in accordance with an example of the present disclosure with a suction system as an actuator and a hinged actuatable element in the first position.
Figure 11:
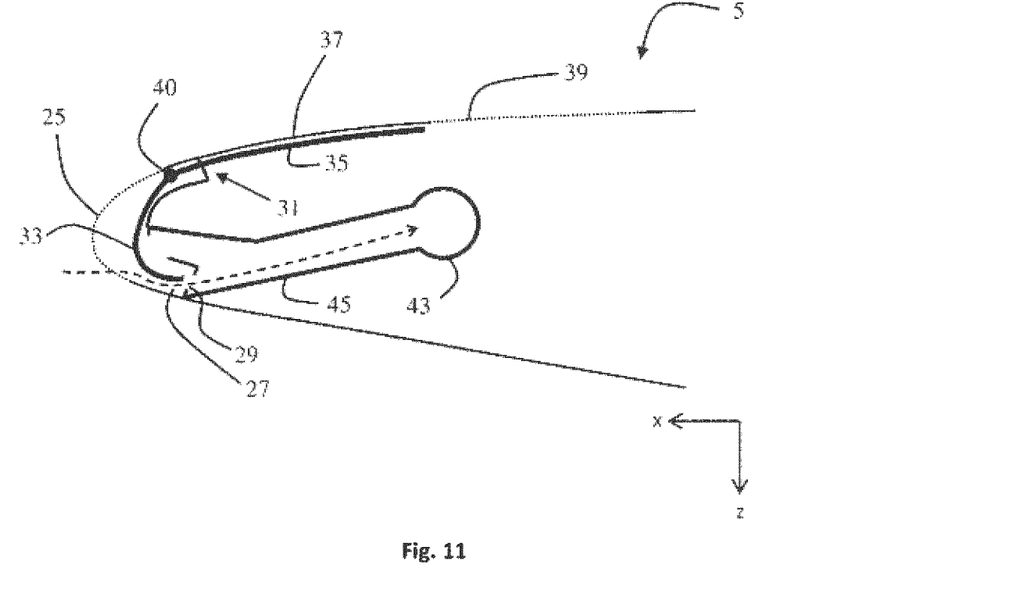
FIG. 11 is a cross-sectional view of a forward portion of an aerodynamic body in accordance with an example of the present disclosure with a suction system as an actuator and a hinged actuatable element in the second position.

FIGS. 10 and 11 show that the actuatable element 33 may be actuated pneumatically. In case an active suction system is needed to provide the necessary suction, a ducting may be connected to the single suction chamber 27. Such a ducting may comprise a trunk duct 43 extending essentially in spanwise direction and a collector duct 45 extending essentially in chordwise direction. The actively reduced pressure in the collector duct 45 may pneumatically suck the actuatable element 33 from the first position towards the second position. The actuatable element 33 may be spring-loaded towards the first position.

Figure 12:
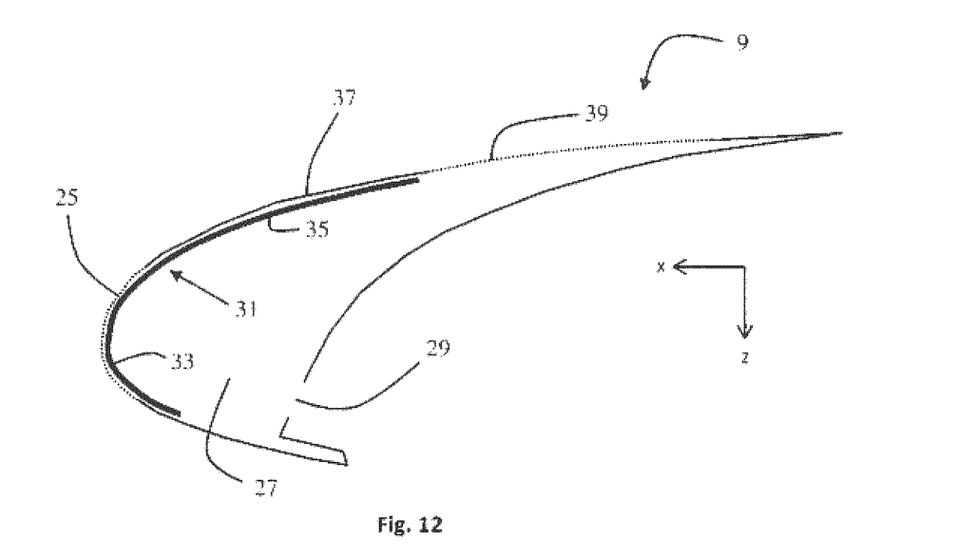
FIG. 12 is a cross-sectional view of a slat as an aerodynamic body in accordance with an example of the present disclosure with a deformable actuatable element in the first position.

FIGS. 12 and 13 show in more detail how the actuatable element 33 is actuated in case of a slat 9 as the aerodynamic body as in FIG. 4. The full inner volume of the slat 9 can be used as a single suction chamber 27 for passive HLF without an active suction system. This is particularly beneficial because the space within the slat 9 is very limited to accommodate a ducting of an active suction system or a complex plurality of suction chambers. The least space-consuming actuation option is the use of a bi-metal component in the actuatable element 33 being deformable upon temperature changes. In FIG. 12, the slat 9 may be deployed during take-off or landing or on ground before take-off. Ice-protection may be required to ensure a safe flight. The bi-metal component is then heated for ice-protection purposes so that it straightens the actuatable element 33 into the first position where it has thermal contact with the first perforated surface portion 25. Furthermore, the actuatable element 33 in the first position closes the perforations of the first perforated surface portion 25 from within so that an inflow from a boundary layer of an outer aerodynamic airflow through the perforations into the slat is prevented.

In FIG. 13, the slat 9 may be retracted in cruise mode at altitudes where no ice-protection is needed. The bi-metal component is not heated and may cool down so that it curls the actuatable element 33 into the second position where it is distanced from the first perforated surface portion 25. Thus, the actuatable element 33 in the second position opens the perforations of the first perforated surface portion 25 so that an inflow from a boundary layer of an outer aerodynamic airflow through the perforations into the slat is allowed. The delayed onset of boundary layer transition in cruise mode reduces drag of the aerodynamic body and saves fuel consumption.

Figure 14:
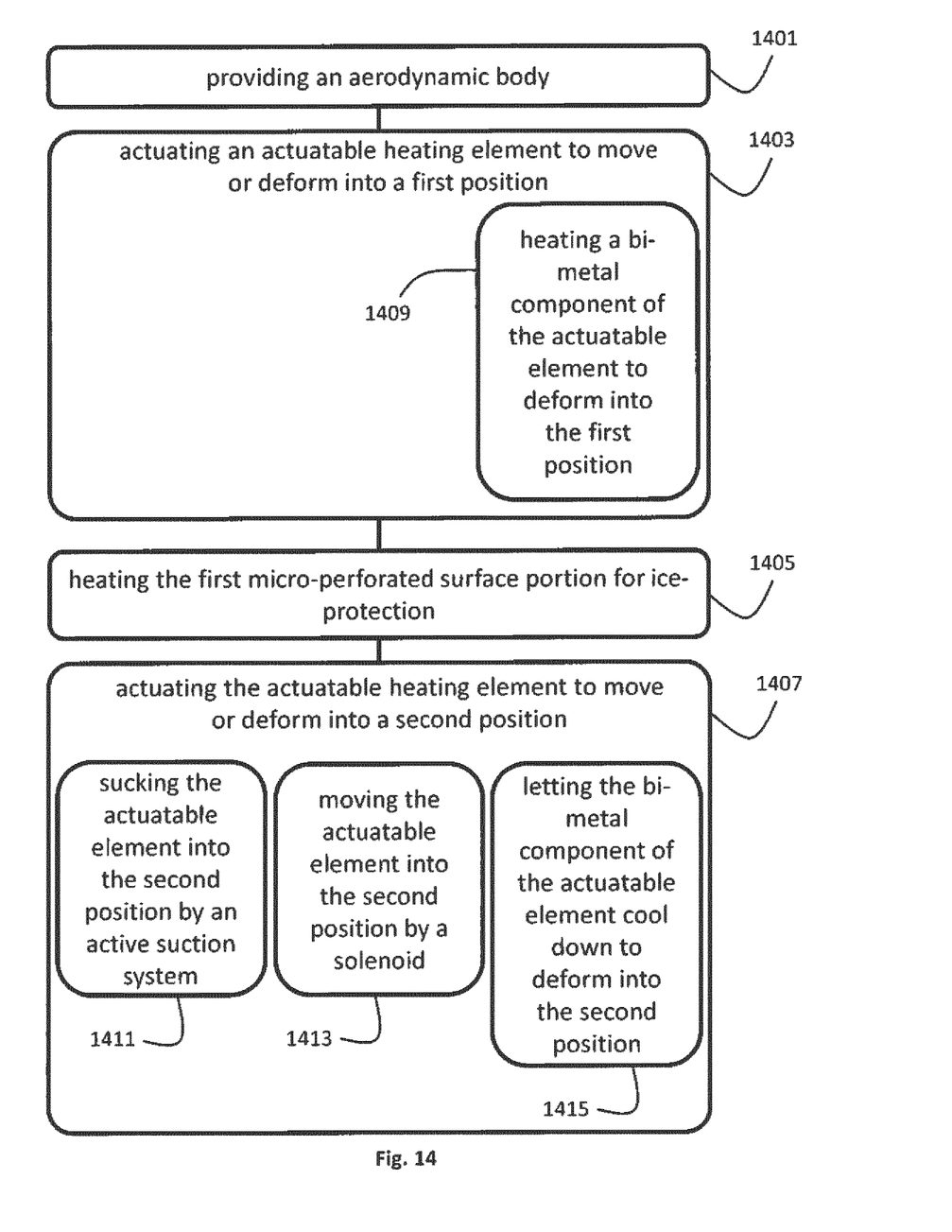
FIG. 14 is a schematic diagram of method steps for creating and/or supporting a laminar flow around an aerodynamic body in accordance with an example of the present disclosure.

FIG. 14 shows an example of method steps for creating and/or supporting a laminar flow around the aerodynamic body. In step 1401, an aerodynamic body comprising at least a first perforated surface portion 25 and an ice-protection system 31 is provided. The first perforated surface portion 25 has perforations and the ice-protection system 31 comprises an actuatable element 33 in accordance with the previous figures. In step 1403, the actuatable element 33 is actuated to move or deform into a first position. In the first position, at least a section of the actuatable element 33 is thermally coupled to the first perforated surface portion 25 and prevents an inflow or outflow between a boundary layer of an outer aerodynamic airflow and the aerodynamic body through at least one of the perforations. In step 1405, the first perforated surface portion 25 is heated for ice-protection. In step 1407, the actuatable element 33 is actuated to move or deform into a second position. In the second position, at least a section of the actuatable element 33 is distanced from the first perforated surface portion 25 and allows an inflow from a boundary layer of an outer aerodynamic airflow through at least one of the perforations into the aerodynamic body. The delayed onset of boundary layer transition creates and/or supports a laminar flow around the aerodynamic body saving fuel consumption.

As part of step 1403, a bi-metal component of the actuatable element 33 may be heated (step 1409) so that the actuatable element 33 deforms into the first position (as shown in FIGS. 6 and 12). Alternatively or in addition to step 1409, the actuatable element 33 may be spring-loaded towards the first position in which it has thermal contact with the first perforated surface portion 25 and closes the perforations from within.

As part of step 1407 there are different actuating options shown as steps 14011, 1413 and 1415, which may be applied as alternatives to each other or in any combination with each other to achieve step 1407 efficiently. In step 14011, an active suction system is provided and used to pneumatically suck the actuatable element 33 into the second position (as shown in FIG. 11). In step 1413, a solenoid 41 is provided and used to magnetically move the actuatable element 33 into the second position (as shown in FIG. 9). In step 1415, the bi-metal component used in step 1409 to deform the actuatable element 33 into the first position is not heated so that the bi-metal component can cool down to deform the actuatable element 33 into the second position.

Where, in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents.

It is to be understood that any feature described in relation to any one embodiment may be used alone, or in combination with other features described, and may also be used in combination with one or more features of any other of the embodiments, or any combination of any other of the embodiments. While at least one exemplary embodiment has been shown and described, it should be understood that other modifications, substitutions and alternatives are apparent to one of ordinary skill in the art and may be changed without departing from the scope of the subject matter described herein, and this application is intended to cover any adaptations or variations of the specific embodiments discussed herein.

In addition, "a" or "one" does not exclude a plural number. Furthermore, characteristics or steps which have been described with reference to one of the above exemplary embodiments may also be used in combination with other characteristics or steps of other exemplary embodiments described above. Method steps may be applied in any order or in parallel or may constitute a part or a more detailed version of another method step. It should be understood that there should be embodied within the scope of the patent warranted hereon all such modifications as reasonably and properly come within the scope of the contribution to the art. Such modifications, substitutions and alternatives can be made without departing from the spirit and scope of the invention.

The invention claimed is:

1. An aerodynamic body for use on an aircraft, wherein the aerodynamic body includes at least a first perforated surface portion and an ice-protection system,
    wherein the ice-protection system includes an actuatable element,
    wherein the actuatable element is movable or deformable between a first position and a second position,
    wherein the first perforated surface portion includes micro-perforations;
    wherein in the first position at least a section of the actuatable element covers an inner region of the first perforated surface portion to be thermally coupled to the first perforated surface portion and to prevent an inflow or an outflow of air between a boundary layer of an outer aerodynamic airflow and the aerodynamic body through the micro-perforations;
    wherein in the second position at least a section of the actuatable element is distanced from the first perforated surface portion and within the aerodynamic body, and
    wherein the actuatable element is configured to allow the inflow or the outflow of air through the micro-perforations.

2. The aerodynamic body according to claim 1, wherein the actuatable element includes an electrical heating element.

3. The aerodynamic body according to claim 1, wherein the aerodynamic body is at least one of a group comprising a main aircraft wing, a horizontal stabiliser, a vertical tail-plane, and a high-lift leading edge device.

4. The aerodynamic body according to claim 1, wherein the actuatable element is movable in a rotatory and/or a translatory way between the first position and the second position.

5. The aerodynamic body according to claim 1, wherein the aerodynamic body defines a leading edge and at least a part of a local chord extending between the leading edge and a trailing edge, and wherein the first perforated surface portion extends around the leading edge over 3% or less of the local chord.

6. The aerodynamic body according to claim 1, wherein the ice-protection system includes a stationary element aft of the actuatable element, wherein the stationary element is permanently thermally coupled to a non-perforated surface portion of the aerodynamic body.

7. The aerodynamic body according to claim 6, wherein the aerodynamic body includes at least a second perforated surface portion aft of the non-perforated surface portion.

8. The aerodynamic body according to claim 1, wherein the aerodynamic body includes an active suction system configured to create and/or support an inflow or outflow between a boundary layer of an outer aerodynamic airflow and the aerodynamic body through the micro-perforations, and wherein the actuatable element is configured to be sucked into the second position by the active suction system.

9. The aerodynamic body according to claim 1, wherein the aerodynamic body includes a solenoid, and wherein the solenoid is configured to moved the actuatable element to the second position.

10. The aerodynamic body according to claim 1, wherein the actuatable element includes a bi-metal component deformable upon temperature changes, wherein the bi-metal component is configured to deform the actuatable element into the first position when the ice-protection system is used, and wherein the bi-metal component is configured to deform the actuatable element into the second position when the ice-protection system is not used.

11. The aerodynamic body according to claim 1, wherein the actuatable element is spring-loaded towards the first or second position.

12. The aerodynamic body according to claim 1, wherein at least some of the perforations comprise micro-perforations.

13. A method for creating and/or supporting a laminar flow around an aerodynamic body, comprising:
  providing an aerodynamic body including at least a first perforated surface portion and an ice-protection system, wherein the ice-protection system includes an actuatable element and wherein the first perforated surface portion includes micro-perforations,
  actuating the actuatable element to move or deform into a first position, wherein in the first position at least a section of the actuatable element covers an inner region of the micro-perforations such that the adjustable element is thermally coupled to the first perforated surface portion and prevents an inflow or outflow between a boundary layer of an outer aerodynamic airflow and the aerodynamic body through the micro-perforations,
  heating the first perforated surface portion for ice-protection,
  actuating the actuatable element to move or deform into a second position, wherein in the second position at least a section of the actuatable element is within the aerodynamic body and distanced from the first perforated surface portion and allows an inflow or outflow between a boundary layer of an outer aerodynamic airflow and the aerodynamic body through the micro-perforations.

14. The method according to claim 13, including the step of:
  providing an active suction system for creating and/or supporting an inflow or outflow between a boundary layer of an outer aerodynamic airflow and the aerodynamic body through the micro-perforations,
  wherein activating the actuatable element to move or deform into the second position comprises sucking the actuatable element into the second position by the active suction system.

15. The method according to claim 13, including the step of:
  providing a solenoid, wherein activating the actuatable element to move or deform into the second position comprises moving the actuatable element into the second position by the solenoid.

16. The method according to claim 13, including the step of:
  providing a bi-metal component being comprised in the actuatable element,
  wherein activating the actuatable element to move or deform into the first position comprises heating the bi-metal component and thereby deforming the actuatable element into the first position,
  wherein activating the actuatable element to move or deform into the second position comprises letting the bi-metal component cool down and thereby deforming the actuatable element into the second position.

* * * * *